L. T. Ilgen,
Clothes Frame,
Nº 57,144. Patented Aug. 14, 1866.

Witnesses:
John H. Addams.
John O. Foster.

Inventor.
Lewis T. Ilgen

UNITED STATES PATENT OFFICE.

LEWIS T. ILGIN, OF CEDARVILLE, ILLINOIS.

IMPROVED CLOTHES-DRIER.

Specification forming part of Letters Patent No. 57,144, dated August 14, 1866.

*To all whom it may concern:*

Be it known that I, LEWIS T. ILGIN, of Cedarville, in the county of Stephenson and State of Illinois, have made certain new and useful Improvements on Clothes-Horses; and I do hereby declare that the following is a full, clear, and exact description thereof, reference being had to the accompanying drawings and letters of reference marked thereon, making a part of this specification, in which—

Figure I is a perspective representation of my clothes-horse when open. Fig. II is an elevation of the same when shut together.

The nature of my invention consists in a frame made of a series of slats crossing each other diagonally, and secured together at the points of intersection by means of rods, on which the clothes are hung, in such a manner as to allow the slats to be shut together and occupy but little space when the horse is not in use; and in connecting the legs of the horse to the body-slats by means of elbow-stops, for the purpose of holding the legs in position when they are drawn out for use. By this arrangement a durable, convenient, and cheap device is produced for supporting garments for drying and other purposes, as the rods are all placed in such a position that the clothes hung upon one will not materially interfere with those hung upon the others.

To enable others skilled in the art to make and use my invention, I will describe the method of construction and operation.

Figure 2:
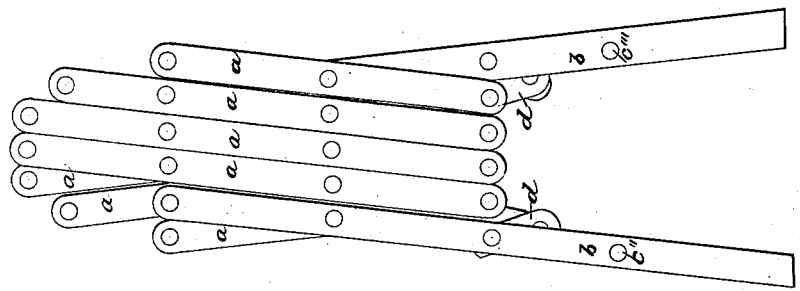

$a$ represents the slats, which are made of wood and of such width and thickness as will give the proper strength for supporting the horse when filled with wet clothes. $b$ shows four of the slats, extending downward for the purpose of forming legs for elevating the principal part of the horse a suitable distance above the floor. $c$ represents the wooden rods, the ends of which pass through the slats $a$ at the points of intersection, and are secured in such a manner as to hold the slats in place and form a joint, so that they may be shut together when desired. $d$ represents what I term "elbow-stops," which are used for the purpose of preventing the legs $b$ from spreading only the required distance apart. Each stop is made of two short slats, which are secured to the opposite stop by means of three rods in such a manner as to allow the stops to shut together when the horse is folded, as seen at Fig. 2. $c'$ shows the rods connecting the tops of the slats where there is no intersection with other slats, and $c''$ the rods supporting the legs near the bottom.

Figure 1:
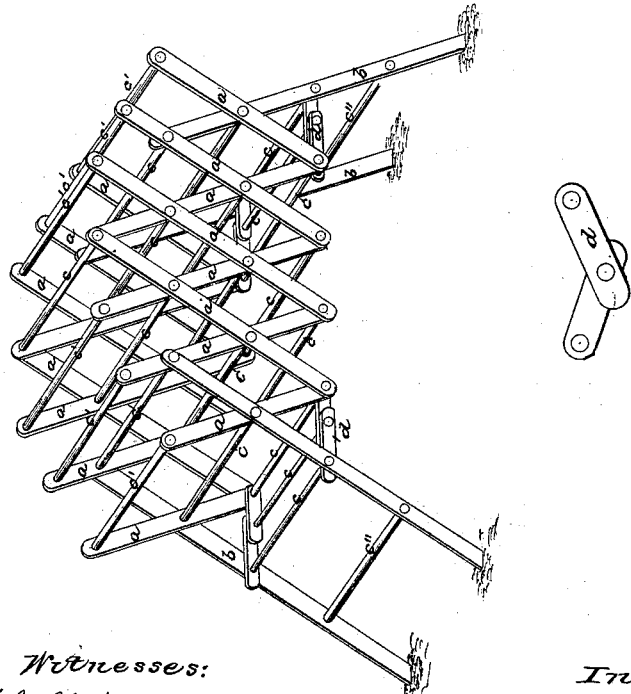

Operation: Fig. 1 represents the clothes-horse in position for hanging the clothes upon the rods $c\ c'\ c''$. The horse can be closed when full of clothes, if desired, and moved to any part of the room without inconvenience. When the horse is not in use it can be shut together, as seen at Fig. 2.

Having thus described my invention, what I claim as new, and desire to secure by Letters Patent of the United States, is—

The arrangement and combination of the slats $a\ b$ with the rods $c\ c'\ c''$ and elbow-stops $d$, substantially as and for the purpose set forth and described.

LEWIS T. ILGIN.

Witnesses:
JOHN H. ADDAMS,
JOHN O. FOSTER.